US011935258B2

(12) United States Patent
Green

(10) Patent No.: US 11,935,258 B2
(45) Date of Patent: Mar. 19, 2024

(54) RANGE DETECTION USING MACHINE LEARNING COMBINED WITH CAMERA FOCUS

(71) Applicant: TOYOTA RESEARCH INSTITUTE, INC., Los Altos, CA (US)

(72) Inventor: Alexander Russell Green, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/195,368

(22) Filed: Mar. 8, 2021

(65) Prior Publication Data

US 2022/0284611 A1    Sep. 8, 2022

(51) Int. Cl.
| | |
|---|---|
| *G06T 7/20* | (2017.01) |
| *B60W 60/00* | (2020.01) |
| *G01C 21/34* | (2006.01) |
| *G06F 18/24* | (2023.01) |
| *G06T 7/11* | (2017.01) |
| *G06T 7/571* | (2017.01) |
| *H04N 23/67* | (2023.01) |

(52) U.S. Cl.
CPC ........... *G06T 7/571* (2017.01); *B60W 60/001* (2020.02); *G01C 21/3407* (2013.01); *G06F 18/24* (2023.01); *G06T 7/11* (2017.01); *H04N 23/672* (2023.01); *B60W 2420/42* (2013.01); *G06T 2207/10148* (2013.01); *G06T 2207/20081* (2013.01); *G06T 2207/30248* (2013.01)

(58) Field of Classification Search
CPC . G06T 7/571; G06T 7/11; G06T 2207/10148; G06T 2207/20081; G06T 2207/30248; H04N 5/232122; B60W 60/001; B60W 2420/42; G01C 21/3407; G06K 9/6267
See application file for complete search history.

(56) References Cited

U.S. PATENT DOCUMENTS

| | | | |
|---|---|---|---|
| 5,053,801 A | 10/1991 | Ishida et al. | |
| 6,480,266 B2 | 11/2002 | Shirai et al. | |
| 7,929,850 B2 | 4/2011 | Yoon et al. | |
| 8,018,524 B2 | 9/2011 | Kawarada | |
| 8,169,532 B2 | 5/2012 | Lyu et al. | |
| 8,953,841 B1 * | 2/2015 | Leblang | G06V 20/20 382/103 |
| 2016/0188977 A1 * | 6/2016 | Kearns | G06V 40/172 348/113 |
| 2018/0176483 A1 * | 6/2018 | Knorr | G06T 19/006 |
| 2020/0238991 A1 * | 7/2020 | Aragon | G05D 1/0221 |
| 2021/0097659 A1 * | 4/2021 | Hung | H04N 5/232133 |

(Continued)

FOREIGN PATENT DOCUMENTS

| | | | | |
|---|---|---|---|---|
| CA | 3012927 A1 * | 1/2020 | ........... | G06K 9/6257 |
| EP | 2823254 B1 | 6/2019 | | |

*Primary Examiner* — Patrick E Demosky
(74) *Attorney, Agent, or Firm* — SEYFARTH SHAW LLP

(57) ABSTRACT

A method for range detection is described. The method includes segmenting an image into one or more segmentation blobs captured by a monocular camera of an ego vehicle. The method includes focusing on pixels forming a selected segmentation blob of the one or more segment blobs. The method also includes determining a distance to the selected segmentation blob according to a focus function value of the monocular camera of the ego vehicle.

15 Claims, 8 Drawing Sheets

(56) References Cited

U.S. PATENT DOCUMENTS

| | | | |
|---|---|---|---|
| 2021/0225012 A1* | 7/2021 | Devitt | G01C 22/00 |
| 2021/0304577 A1* | 9/2021 | Hollar | G06K 7/10356 |
| 2022/0129684 A1* | 4/2022 | Saranin | G06V 20/58 |

* cited by examiner

RANGE DETECTION USING MACHINE LEARNING COMBINED WITH CAMERA FOCUS

BACKGROUND

Field

Certain aspects of the present disclosure generally relate to machine learning and, more particularly, range detection using machine learning combined with camera focus.

Background

Autonomous agents (e.g., vehicles, robots, etc.) rely on machine vision for sensing a surrounding environment and analyzing areas of interest in images of the surrounding environment. Although scientists have spent decades studying the human visual system, a solution for realizing equivalent machine vision remains elusive. Realizing equivalent machine vision is a goal for enabling autonomous agents. Machine vision is distinct from the field of digital image processing. Instead, machine vision recovers a three-dimensional (3D) structure of the world from images and uses the 3D structure for fully understanding a scene based on a two-dimensional camera input. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. Several different technologies have been developed to determine the range of objects within the surrounding scene from a reference point. For example, LIDAR sensors can determine range by illuminating the target with laser light and measuring the reflection with a sensor. Other sensors can also be utilized to determine range as well. For example, camera sensors are also used to determine the range of the objects within the surrounding scene. Unfortunately, these various sensors may be cost prohibitive for certain autonomous applications. A technique for range detection of objects within a surrounding scene using a low-cost monocular camera is desired.

SUMMARY

A method for range detection is described. The method includes segmenting an image into one or more segmentation blobs captured by a monocular camera of an ego vehicle. The method includes focusing on pixels forming a selected segmentation blob of the one or more segment blobs. The method also includes determining a distance to the selected segmentation blob according to a focus function value of the monocular camera of the ego vehicle.

A non-transitory computer-readable medium having program code recorded thereon for range detection is described. The program code is executed by a processor. The non-transitory computer-readable medium includes program code to segment an image into one or more segmentation blobs captured by a monocular camera of an ego vehicle. The non-transitory computer-readable medium also includes program code to focus on pixels forming a selected segmentation blob of the one or more segment blobs. The non-transitory computer-readable medium further includes program code to determine a distance to the selected segmentation blob according to a focus function value of the monocular camera of the ego vehicle.

A system for range detection is described. The system includes a segmentation blob detection module to segment an image into one or more segmentation blobs captured by a monocular camera of an ego vehicle. The system also includes a segmentation blob focus module to focus on pixels forming a selected segmentation blob of the one or more segment blobs. The system further includes a range detection module to determine a distance to the selected segmentation blob according to a focus function value of the monocular camera of the ego vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
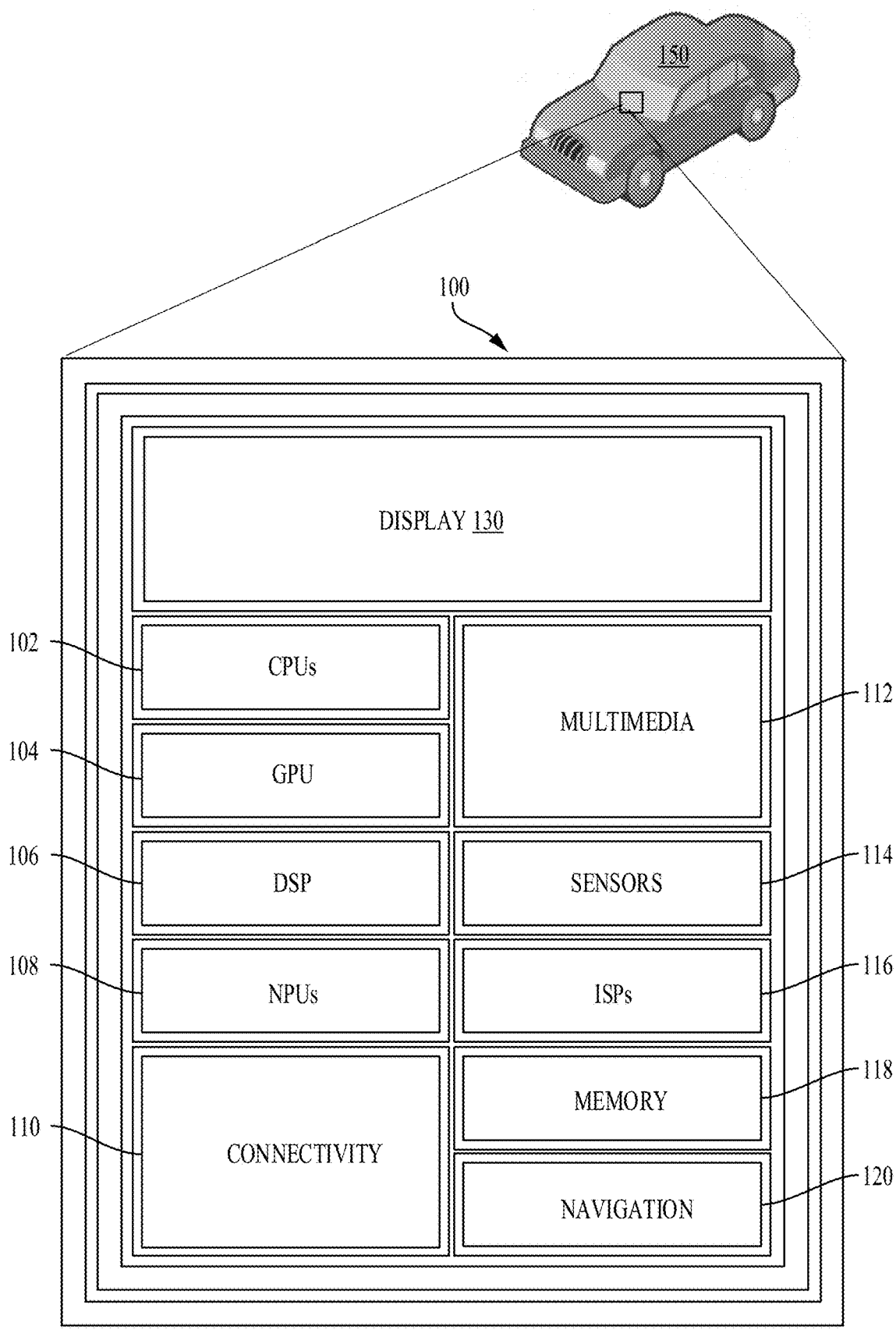
FIG. 1 illustrates an example implementation of designing a system using a system-on-a-chip (SOC) for learning-based online mapping, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. For example, autonomous operation, as well as advanced driver assistance systems (ADAS), may rely on sensors for performing range detection relative to objects captured by a monocular camera.

Several different technologies are developed to determine the range of objects within a scene relative to a reference point. For example, LIDAR sensors can determine range by illuminating a target with laser light and measuring the reflection with a sensor. Differences in laser return times and wavelengths are used to make digital 3D representations of the target. Other sensors are also used to determine range as well. For example, sonar sensors and radar sensors can determine the range of objects but generally do not provide much information regarding the detected object, such as the size, shape, and other visual features.

Camera sensors are also used to determine the range of objects within a scene. In some cases, stereo cameras can simulate human binocular vision and, therefore, provide the ability to capture three-dimensional images and determine the range of other objects. A drawback of this system is the use of two cameras to determine range. Unfortunately, these various sensors and cameras may be cost prohibitive for certain autonomous applications. A technique for range detection of objects within a surrounding scene using a low-cost monocular camera is desired.

Recent developments use monocular cameras (e.g., single-camera sensors) to determine distance. For monocular cameras, one way of calculating distance is by estimating a disparity map for a full image using a deep learning method. While this methodology generally works, it involves significant computational resources to determine the range of one or more objects. Furthermore, this monocular camera technique is generally not as accurate as ranges determined by LIDAR sensors or stereo camera systems.

Aspects of the present disclosure are directed to performing range detection of objects within a scene using a low-cost monocular camera. This aspect of the present disclosure is an improvement over the prior art in that the present disclosure allows for the ranging of one or more objects within the scene captured by a monocular camera using the monocular camera's focus function and scene understanding. Ranges determined by the system may be provided to other downstream processes to assist in object detection, tracking, or other processes.

One aspect of the present disclosure includes a monocular camera that captures a scene and focuses on a depth of one or more objects detected within the scene. Once the appropriate focus is determined for an object within the scene, the focus information is used by a processor to estimate the range of the object within the scene. Objects located within the image are then segmented. As described, segmentation involves identifying one or more pixels within the image associated with one object, which is referred to as a segmentation blob. This segmentation can be achieved using any one of many different algorithms developed to segment objects. For example, semantic segmentation is an approach for detecting each pixel belonging to a class of the object. Another example involves instance segmentation, which is an approach that identifies each every pixel belonging to an instance of the object.

FIG. 1 illustrates an example implementation of the aforementioned system and method for range detection based on a monocular camera using a system-on-a-chip (SOC) 100 of an ego vehicle 150. The SOC 100 may include a single processor or multi-core processors (e.g., a central processing unit (CPU)), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The system-on-a-chip (SOC) 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130, illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The system-on-a-chip (SOC) 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for range detection using camera focus on objects in an image captured by the sensor processor 114. The instructions loaded into a processor (e.g., CPU 102) may also include code for planning and control (e.g., of the ego vehicle 150) in response to the range detection relative to objects from the images captured by the sensor processor 114.

Figure 2:
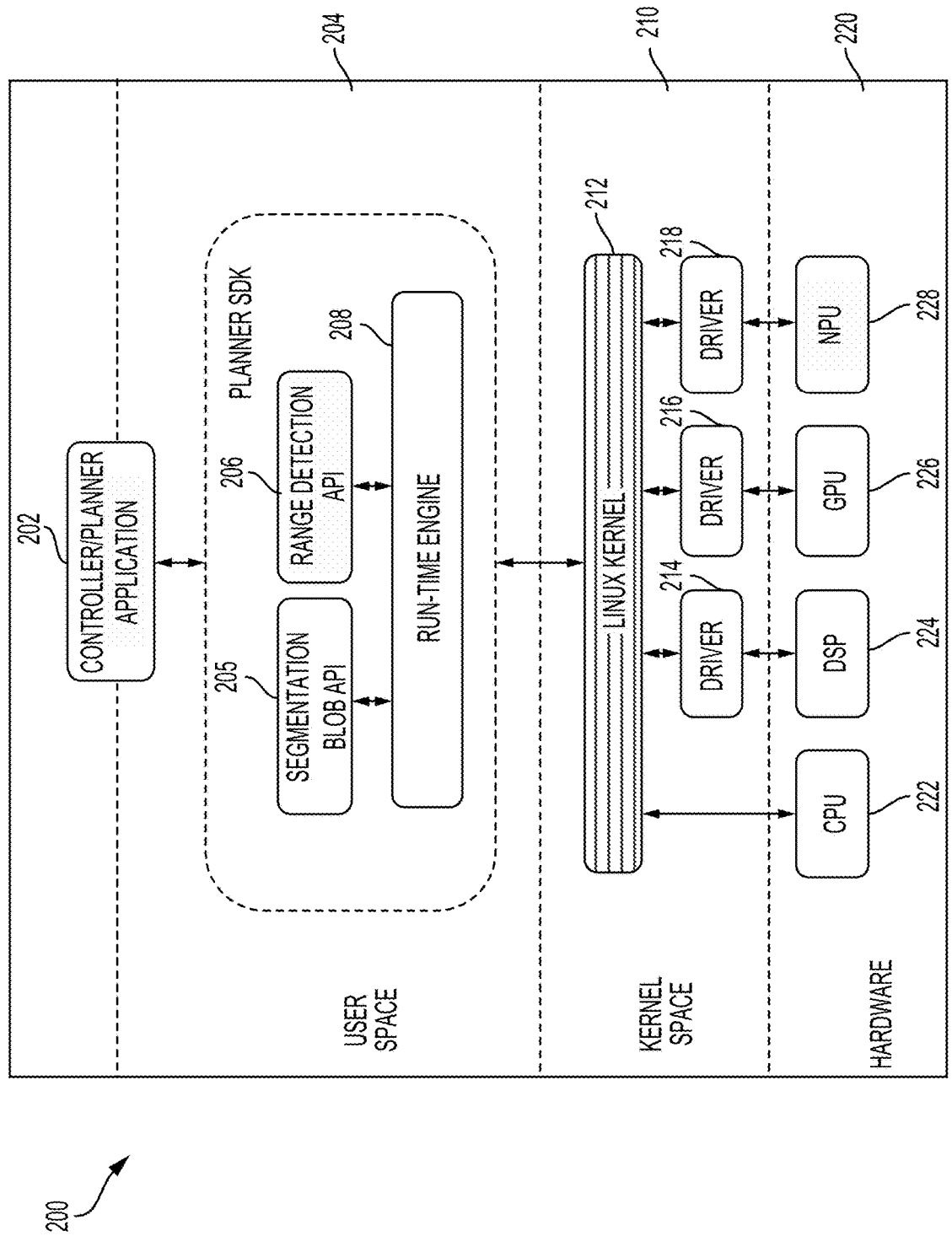
FIG. 2 is a block diagram illustrating a software architecture that may modularize functions for range detection using camera focus, according to aspects of the present disclosure.

FIG. 2 is a block diagram illustrating a software architecture 200 that may modularize functions for planning and control of an ego vehicle using range detection using camera focus, according to aspects of the present disclosure. Using the architecture, a controller/planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller/planner application 202.

The controller/planner application 202 may be configured to call functions defined in a user space 204 that may, for example, analyze a scene in a video captured by a monocular camera of an ego vehicle. Range detection of objects in the scene is performed on segmentation blobs by using a monocular camera focus. The controller/planner application 202 may make a request to compile program code associated with a library defined in a segmentation blob application programming interface (API) 205 to generate a semantic segmentation of objects of interest of an ego vehicle within a scene of a video captured by the monocular camera of the ego vehicle. The range detection on the objects in an image is performed using the range detection API 206.

A run-time engine 208, which may be compiled code of a run-time framework, may be further accessible to the controller/planner application 202. The controller/planner application 202 may cause the run-time engine 208, for example, to perform range detection using a camera focus on features of interest for an ego vehicle. When an object is detected within a predetermined distance of the ego vehicle, the run-time engine 208 may in turn send a signal to an operating system 210, such as a Linux Kernel 212, running on the system-on-a-chip (SOC) 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network (DNN) may be configured to run on a combination of processing blocks, such as the CPU 222 and the GPU 226, or may be run on the NPU 228, if present.

Figure 3:
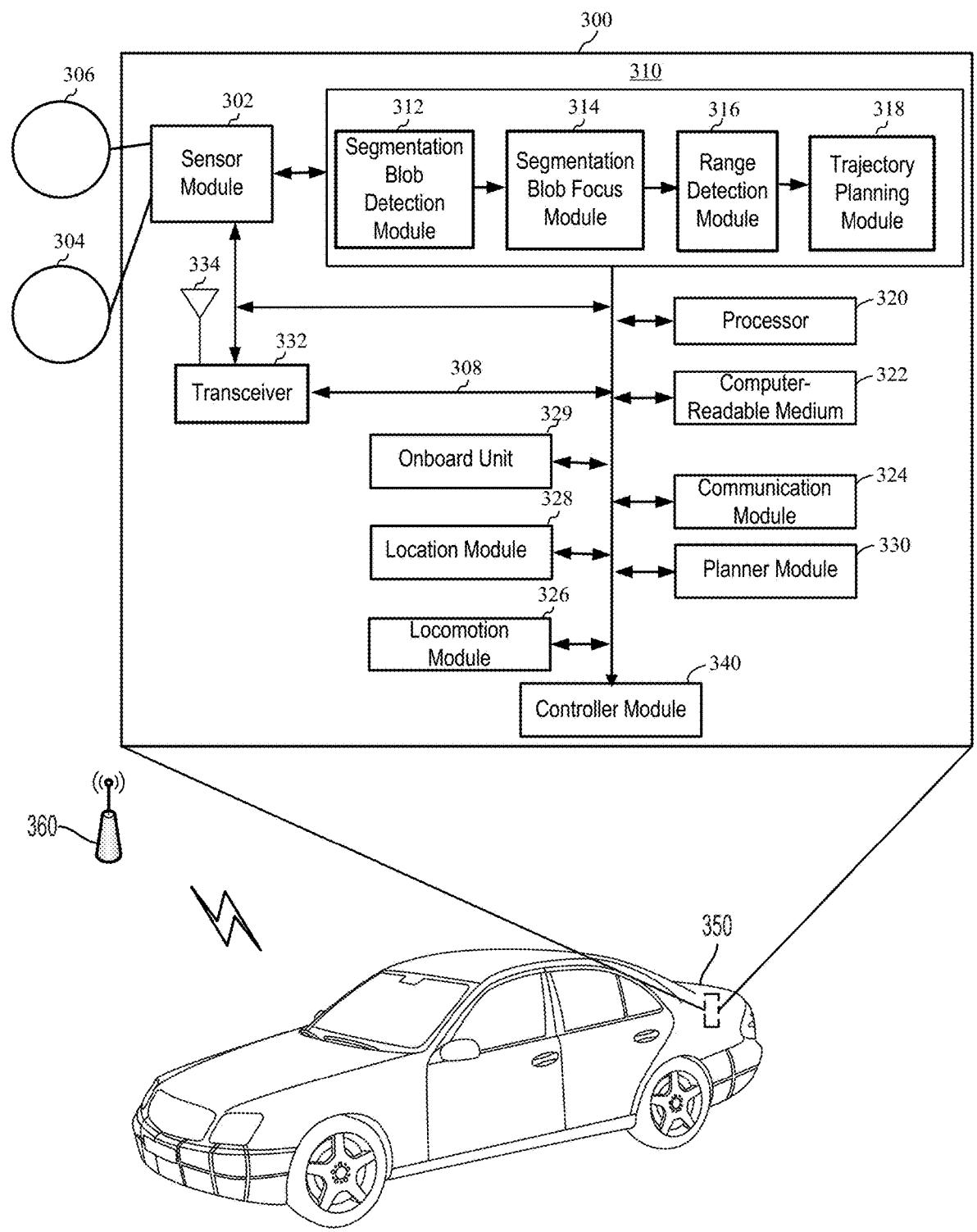
FIG. 3 is a diagram illustrating an example of a hardware implementation for a range detection system, according to aspects of the present disclosure.

FIG. 3 is a diagram illustrating an example of a hardware implementation for a range detection system, according to aspects of the present disclosure. A range detection system 300 may be configured for segmenting objects of interest in a scene and detecting a range to the objects based on a camera focus value. The range detection enables improved planning and controlling of an ego vehicle in response to detected ranges to objects of interest in images from video captured through a camera during operation of a car 350. The range detection system 300 may rely on segmentation of objects in an image captured by a monocular camera of the car 350.

The range detection system 300 may be a component of a vehicle, a robotic device, or other device. For example, as shown in FIG. 3, the range detection system 300 is a component of the car 350. Aspects of the present disclosure are not limited to the range detection system 300 being a component of the car 350, as other devices, such as a bus, motorcycle, or other like vehicle, are also contemplated for using the range detection system 300. The car 350 may be autonomous or semi-autonomous.

The range detection system 300 may be implemented with an interconnected architecture, represented generally by an interconnect 308. The interconnect 308 may include any number of point-to-point interconnects, buses, and/or bridges depending on the specific application of the range detection system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, an onboard unit 329, a planner module 330, and a controller module 340. The interconnect 308 may also link various other circuits, such as timing sources, peripherals, voltage regulators, and power management circuits, which are well known in the art, and therefore, will not be described any further.

The range detection system 300 includes a transceiver 332 coupled to the sensor module 302, the vehicle perception module 310, the processor 320, the computer-readable medium 322, the communication module 324, the locomotion module 326, the location module 328, the onboard unit 329, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit a probabilistic map of objects within a video and/or planned actions from the vehicle perception module 310 to a server (not shown).

The range detection system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the range detection system 300 to perform the various functions described for ego vehicle perception of objects of interest for an ego vehicle within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing two-dimensional (2D) RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, feature information determined from images captured by the first sensor 304 and/or the second sensor 306 may be transmitted via the transceiver 332. The first sensor 304 and the second sensor 306 may be coupled to the car 350 or may be in communication with the car 350.

Understanding a scene from a video input based on objects of interest for an ego vehicle within a scene is an important perception task in the area of autonomous driving, such as the car 350. Aspects of the present disclosure are directed to performing range detection of objects within a scene using a low-cost monocular camera. This aspect of the present disclosure is an improvement over the prior art in that the present disclosure allows for the ranging of one or more objects within a scene captured by a monocular camera using the monocular camera's focus function and scene understanding. Ranges determined by the range detection system 300 may be provided to other downstream processes to assist in object detection, tracking, or other processes. The detected ranges may be used for an advanced driver assistance system of an ego vehicle, such as the car 350, which may be a connected vehicle.

Connected vehicle applications support vehicle-to-vehicle (V2V) communications and vehicle-to-infrastructure (V2I) communications with wireless technology. For example V2V communications use wireless signals to send information back and forth between other connected vehicles (e.g., location, speed, and/or direction). Conversely, V2I communications involve V2I (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication-Physical layer using microwave at 5.9 GHz (review); EN 12795: 2002 Dedicated Short-Range Communication (DSRC)—DSRC Data link layer: Medium Access and Logical Link Control (review); EN 12834:2002 Dedicated Short-Range Communication—Application layer (review); EN 13372: 2004 Dedicated Short-Range Communication (DSRC)—DSRC profiles for RTTT applications (review); and EN ISO 14906:2004 Electronic Fee Collection—Application interface.

A dedicated short-range communication (DSRC)-compliant global positioning system (GPS) unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), third generation (3G), etc. The communication module 324 may also communicate with other components of the car 350 that are not modules of the range detection system 300. The transceiver 332 may be a communications channel through a network access point 360. The communications channel may include dedicated short-range communication (DSRC), LTE, LTE-device-to-device (D2D) (LTE-D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X) (LTE-V2X), LTE-device-to-device (D2D) (LTE-D2D), voice over long term evolution (VoLTE), or any other mobile data network or combination of mobile data networks. Further, the network access point 360 may include one or more Institute of Electrical and Electronics Engineers (IEEE) 802.11 wireless networks.

The range detection system 300 also includes the planner module 330 for planning a selected trajectory to perform a route/action (e.g., collision avoidance) of the car 350, and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and highly autonomous vehicle.

The vehicle perception module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306. In some aspects of the present disclosure, the first sensor 304 and the second sensor 306 are configured using a low-cost monocular camera. In this aspect of the present disclosure, the vehicle perception module 310 performs range detection of features detected from images captured by the first sensor 304 or the second sensor 306 of the car 350.

As shown in FIG. 3, the vehicle perception module 310 includes a segmentation blob detection module 312, a segmentation blob focus module 314, a range detection module 316, and a trajectory planning module 318 (e.g., based on the range detection module 316). The segmentation blob detection module 312, the segmentation blob focus module 314, the range detection module 316, and the trajectory planning module 318 may be components of a same or different artificial neural network, such as a deep neural network (DNN). In operation, the vehicle perception module 310 receives a data stream from the first sensor 304 and/or the second sensor 306. The data stream may include a two-dimensional red-green-blue (2D RGB) image from the first sensor 304 and light detection and ranging (LIDAR) data points from the second sensor 306. The data stream may include multiple frames, such as image frames. In this configuration, the first sensor 304 captures monocular (single camera) 2D RGB images.

The vehicle perception module 310 is configured to understand a scene from a video input (e.g., the sensor module) based on objects of interest. For example, the objects of interest include, but are not limited to driving lanes, lane lines, intersections, stop lines, crosswalks, and the like, within the scene to perform a perception task during autonomous driving of the car 350. Aspects of the present disclosure are directed to range detection (e.g., the range detection module 316) in the car 350. The range detection module 316 makes it possible to detect a range of objects of interest relative to the car 350 using the range detection module 316 in combination with the segmentation blob focus module 314. The range detection module 316 makes it possible to perform range detection of objects within a scene using a low-cost monocular camera.

Figure 4:
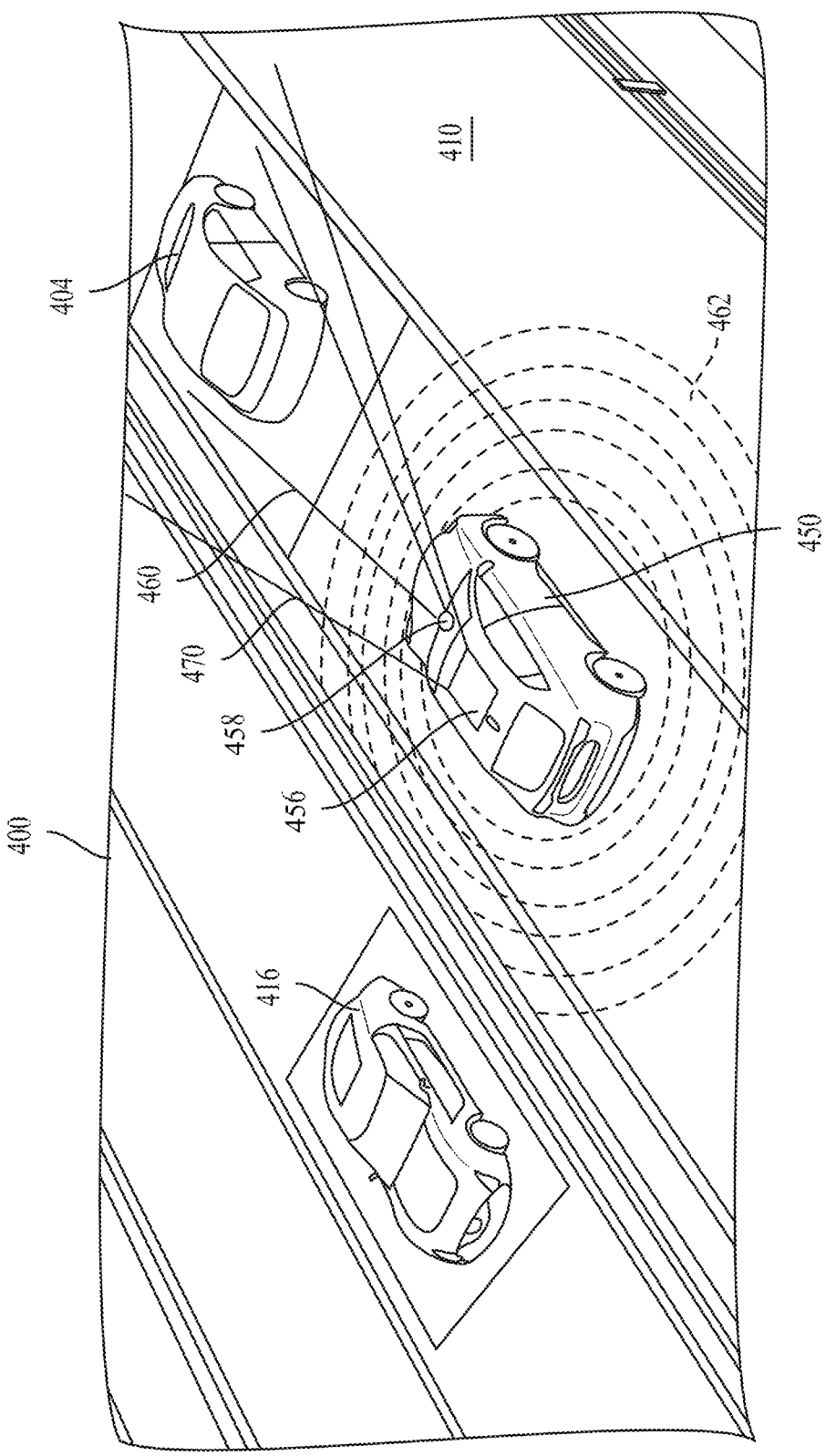
FIG. 4 is a drawing illustrating an example of an ego vehicle in an environment, according to aspects of the present disclosure.

FIG. 4 illustrates an example of an ego vehicle 450 (e.g., the car 350) in an environment 400 according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a monocular camera 458, such as a 2D RGB camera, and a second sensor 456. The second sensor 456 may be another RGB camera or another type of sensor, such as ultrasound, and/or radio detection and ranging (RADAR), light detection and ranging (LIDAR), as shown by reference number 462. Additionally, or alternatively, the ego vehicle 450 may include one or more additional sensors. For example, the additional sensors may be side facing and/or rear facing sensors.

In one configuration, the monocular camera 458 captures a 2D image that includes objects in the field of view 460 of the monocular camera 458. The second sensor 456 may generate one or more output streams. The 2D image captured by the monocular camera 458 includes a 2D image of the first vehicle 404, as the first vehicle 404 is in the field of view 460 of the monocular camera 458. A field of view 470 of the second sensor 456 is also shown.

The information obtained from the second sensor 456 and the monocular camera 458 may be used to navigate the ego vehicle 450 along a route when the ego vehicle 450 is in an autonomous mode. The second sensor 456 and the monocular camera 458 may be powered from electricity provided from the battery (not shown) of the ego vehicle 450. The battery may also power the vehicle's motor. The information obtained from the second sensor 456 and the monocular camera 458 may be used to generate a 3D representation of an environment.

As noted, range detection is a desired feature for enabling autonomous driving and advanced driver assistance systems (ADAS). In one aspect of the present disclosure, the monocular camera 458 is mounted to the ego vehicle 450 to capture an external scene to the ego vehicle 450. Images captured by the monocular camera 458 are provided to a processing system that may include one or more processors, such as the range detection system 300. Objects located within the image are then segmented using the segmentation blob detection module 312. This segmentation blob detection module 312 is trained to identify a collection of pixels, referred to as a "segmentation blob" within the image associated with one object, such as the first vehicle 404 in FIG. 4.

Figure 5:
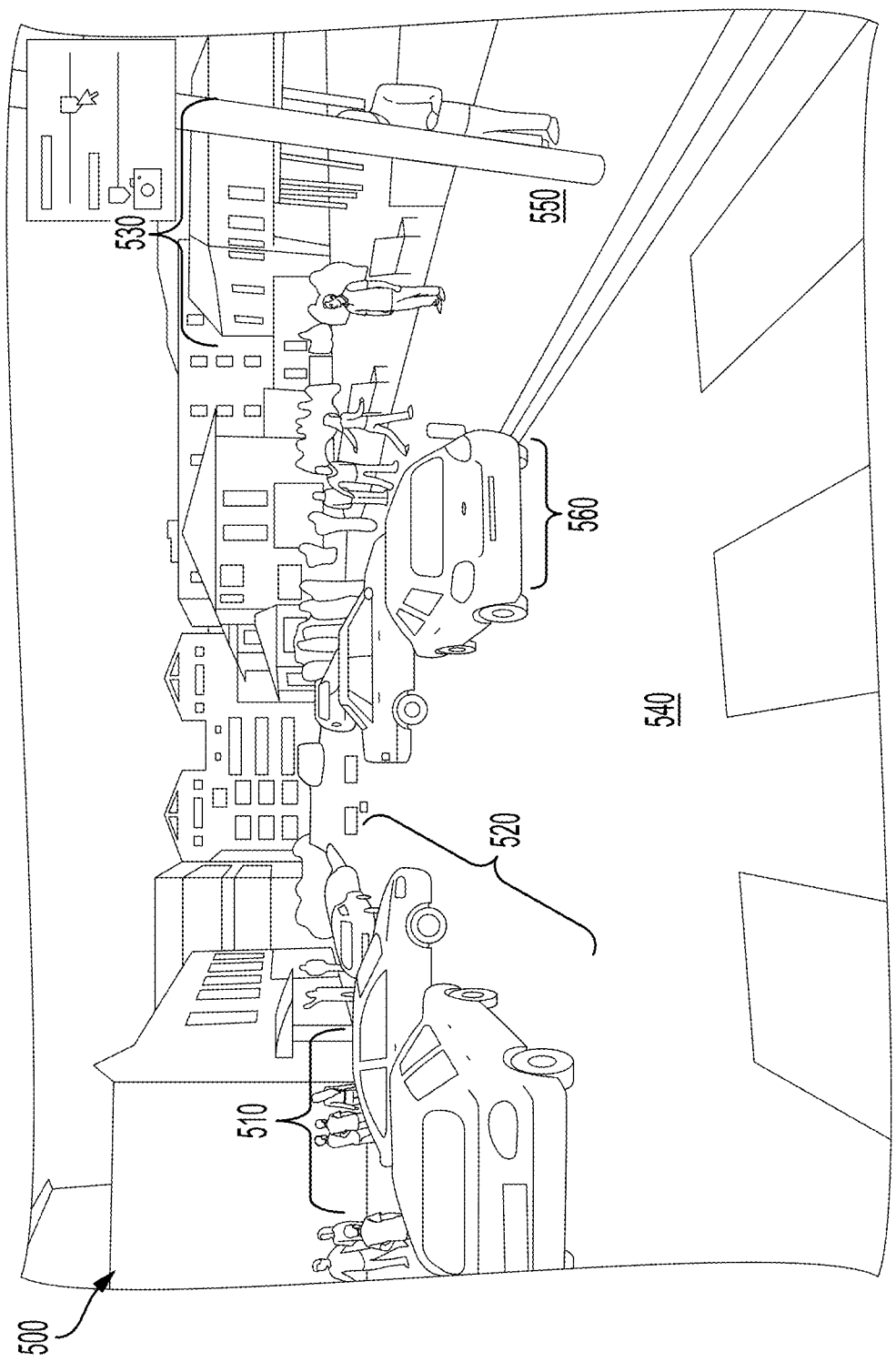
FIG. 5 is a drawing illustrating an image captured by a monocular camera of an ego vehicle, according to aspects of the present disclosure.

FIG. 5 is a drawing illustrating an image captured by a monocular camera of an ego vehicle, according to aspects of the present disclosure. The captured image 500 includes various objects, such as pedestrians 510, vehicles 520 (e.g., a red car 560), buildings 530, street surfaces 540, and sidewalks 550. Using any of several different segmentation algorithms, the captured image 500 is segmented into different objects. For example, semantic segmentation is an approach detecting each pixel belonging to a class of the object. Another example involves instance segmentation, which is an approach that identifies each pixel belonging to an instance of the object. It should be understood that the segmentation of the pixels within the captured image 500 can be performed by any one of a number of different algorithms, as illustrated in FIG. 6.

Figure 6:
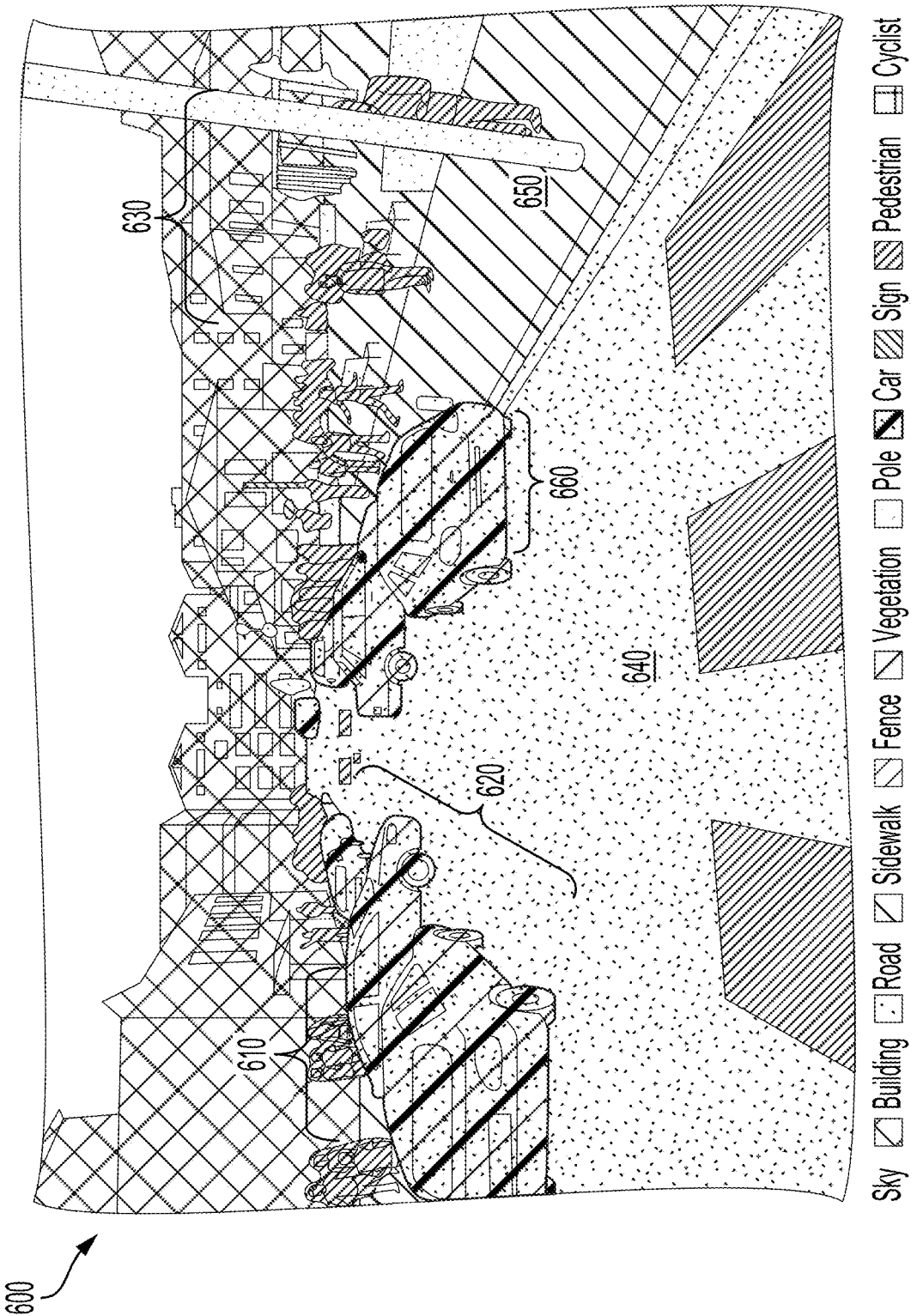
FIG. 6 is a drawing illustrating a segmentation image generated from the image of FIG. 5, according to aspects of the present disclosure.

FIG. 6 is a drawing illustrating a segmentation image 600 generated from the captured image 500 of FIG. 5, according to aspects of the present disclosure. As noted above, the segmentation of the objects of the scene within the captured image 500 forms segmentation blobs in the segmentation image 600. For example, the segmentation blobs include pedestrian blobs 610, vehicle blobs 620 (e.g., a red car blob 660), building blobs 630, street surface blobs 640, and sidewalk blobs 650. These blobs are a collection of pixels that are associated with one object, such as the red car 560 shown in FIG. 5.

Figure 7:
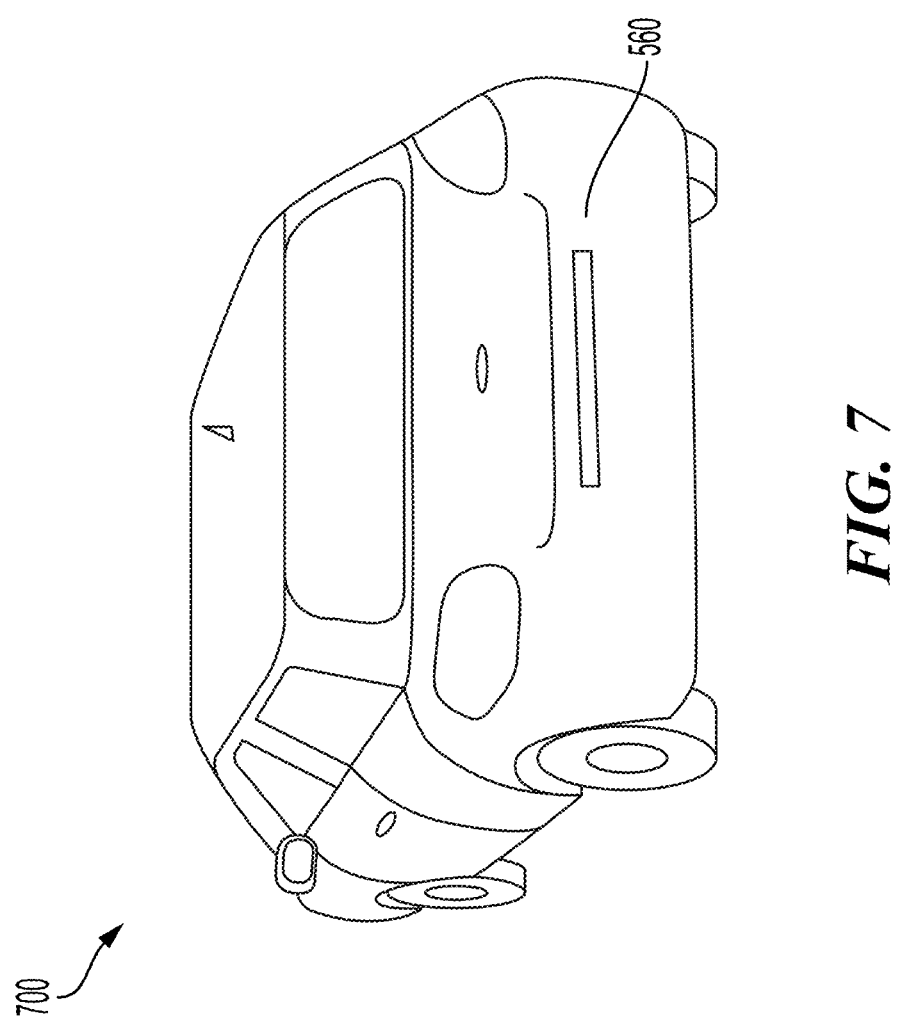
FIG. 7 is a drawing illustrating a segmentation blob of the segmentation image of FIG. 6, according to aspects of the present disclosure.

FIG. 7 is a drawing illustrating focusing on a segmentation blob 700 of the red car blob 660 of the segmentation image 600 of FIG. 6, according to aspects of the present disclosure. In this example, the segmentation blob 700 is a collection of pixels from the scene of FIG. 5 that is associated with the red car 560. According to aspects of the present disclosure, a monocular camera focus is directed on the red car 560 that is represented by the blob of pixels of the segmentation blob 700.

This aspect of the present disclosure relies on a monocular camera to capture a scene in an image including one or more objects of interest within the scene. For example, the objects of interest may include pedestrians and vehicles. Alternatively, the objects of interest may include each detected object within the scene. Once the objects of interest are located within the image, the objects of interest are segmented by identifying one or more pixels (e.g., the segmentation blob 700) within the image associated with the object of interest. Aspects of the present disclosure provide improved range detection by segmenting the image prior to performing range detection.

As described, segmentation involves identifying one or more pixels within the image associated with one object, which is referred to as a segmentation blob. This segmentation can be achieved using any one of many different algorithms developed to segment objects. For example, semantic segmentation is an approach for detecting each pixel belonging to a class of the object. Another example involves instance segmentation, which is an approach that identifies each and every pixel belonging to an instance of the object. In this example, the red car 560 is shown as the segmentation blob 700 in FIG. 7.

Following segmentation of the image, an auto-focus operation of the monocular camera is performed on a segmentation blob. For example, as shown in FIG. 7, an auto-focus operation is performed on the segmentation blob 700 of the red car 560 in FIG. 5. In some aspects, the range detection focuses on a depth of other objects of interest detected within the scene. Once the appropriate focus is determined for an object of interest within the scene, the focus information is used by a processor to estimate the range of the object of interest within the scene. For example, as shown in FIG. 3, the range detection module 316 computes a range to the segmentation blob 700 based on an auto-focus value to bring the segmentation blob 700 in focus by the segmentation blob focus module 314.

In aspects of the present disclosure, the segmentation blob 700 of pixels is "in focus" when the contrast of the pixels is at a maximum. For example, the segmentation blob focus module 314 focuses on the segmentation blob 700 by using contrast-detection combined with actuating the focus on the monocular camera 458 of FIG. 4. In some aspects of the present disclosure, the focus is directed to balance capturing relevant objects with an available time between frames. Alternatively, the focus captures different frames at different acceptable focus depths. In some aspects, instead of using contrast detection, phase detection is used to focus on the segmentation blob 700. Phase detection is achieved by dividing the incoming light into pairs of images and comparing the pairs of images.

According to aspects of the present disclosure, segmenting the scene allows for better range accuracy as the pixels on the object (e.g., the segmentation blob 700) are used to determine focus. For example, background pixels can be adjacent to pixels of interest but at a very different range. This aspect of range detection allows for various focus strategies. For example, two focus strategies include quickly focusing (and estimating range) solely on an object of interest such as a car, or estimating range to all blobs in the segmented image. These focus strategies are faster compared to an approach where the range is estimated for all pixels using a brute force focus approach of conventional range detection. Once the blob's appropriate focus has been determined—either through contrast detection or phase detection—the determined focus can be used to determine the range to the object represented by the blob. Moreover, using the lens equation, which expresses the quantitative relationship between the object distance, the image distance, and the focal length, an object's distance represented by the blob pixels is calculated, for example, as described in FIG. 8.

Figure 8:
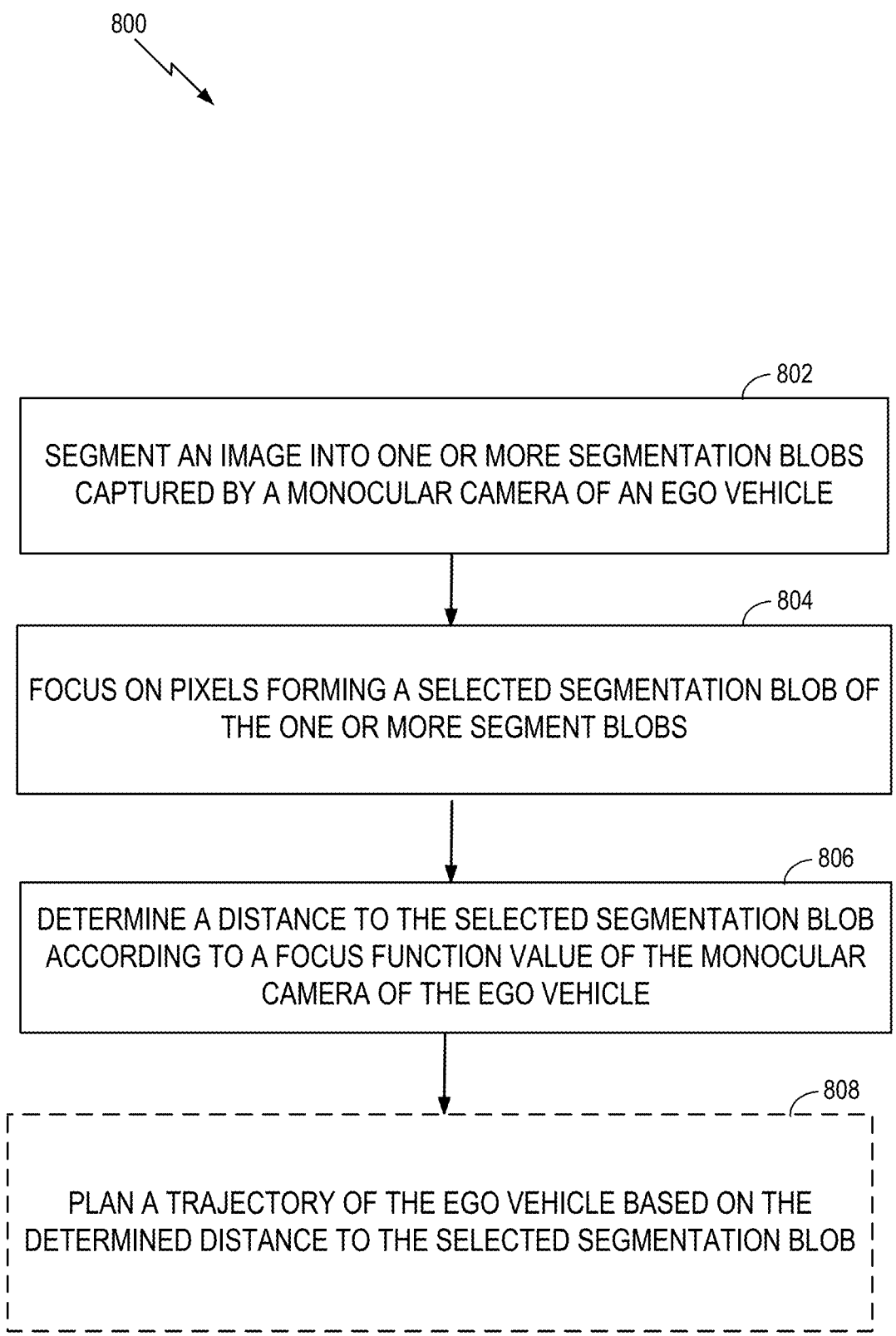
FIG. 8 is a flowchart illustrating a method of range detection using camera focus, according to aspects of the present disclosure.

FIG. 8 is a flowchart illustrating a method of range detection using camera focus, according to aspects of the present disclosure. The method 800 begins at block 802, in which an image is segmented into one or more segmentation blobs captured by a monocular camera of an ego vehicle. For example, as shown in FIGS. 5 and 6, the segmentation of the objects of the scene within the captured image 500 forms segmentation blobs in the segmentation image 600. For example, the segmentation blobs include pedestrian blobs 610, vehicle blobs 620 (e.g., a red car blob 660), building blobs 630, street surface blobs 640, and sidewalk blobs 650. These blobs are a collection of pixels that are associated with one object, such as the red car 560 shown in FIG. 5.

At block 804, a focus is performed on pixels forming a selected segmentation blob of the one or more segment blobs. For example, the segmentation blob 700 of pixels is "in focus" when the contrast of the pixels is at a maximum. For example, the segmentation blob focus module 314 focuses on the segmentation blob 700 by using contrast-detection combined with actuating the focus on the monocular camera 458 of FIG. 4. In some aspects of the present disclosure, the focus is directed to balance capturing relevant objects with the available time between frames. Alternatively, the focus captures different frames at different acceptable focus depths. In some aspects, instead of using contrast detection, phase detection is used to focus on the segmentation blob 700.

At block 806, a distance to the selected segmentation blob is determined according to a focus function value of the monocular camera of the ego vehicle. For example, as shown in FIG. 7, an auto-focus operation is performed on the segmentation blob 700 of the red car 560 in FIG. 5. In some aspects of the present disclosure, the range detection focuses on a depth of other objects of interest detected within the scene. Once the appropriate focus is determined for an object of interest within the scene, the focus information is used by a processor to estimate the range of the object of interest within the scene. For example, as shown in FIG. 3, the range detection module 316 computes a range to the segmentation blob 700 based on an auto-focus value to bring the segmentation blob 700 in focus by the segmentation blob focus module 314.

At optional block 808, a trajectory of the ego vehicle is planned based on the determined distance to the selected segmentation blob. For example, as shown in FIG. 3, the trajectory planning module 318 is configured to plan a trajectory of an ego vehicle (e.g., the car 350), according to the determined distance to the segmentation blob 700, as shown in FIG. 7. In addition, the planner module 330 and/or the controller module 340 of FIG. 3 are configured to select vehicle control actions (e.g., acceleration, braking, steering, etc.) based on determined distance to the segmentation blob 700, as shown in FIG. 7.

The method 800 further includes periodically updating the offline feature map by at least one vehicle during operation of the at least one vehicle. The method 800 also includes generating the probabilistic map by generating objects of interest, including driving lanes, lane lines, intersections, stop lines, and/or crosswalks. The method 800 further includes storing images captured through front-facing and/or side-facing cameras during normal operation of a fleet of vehicles. The method 800 also includes detecting features from stored images captured by the fleet of vehicles. The method 800 further includes updating the offline feature map to form a periodically updated feature map to enable the learning based online mapping of the method 800. The method 800 also includes focusing by adjusting a focus on the pixels forming the selected segmentation blob until a contrast of the pixels is at a maximum value.

In some aspects of the present disclosure, the method 800 may be performed by the system-on-a-chip (SOC) 100 (FIG. 1) or the software architecture 200 (FIG. 2) of the ego vehicle 150 (FIG. 1). That is, each of the elements of the method 800 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array (FPGA) signal or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a compact disc-read-only memory (CD-ROM), and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more programmable gate arrays (PGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into random access memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., random access memory (RAM), read-only memory (ROM), a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for range detection, comprising:
    segmenting an image into one or more segmentation blobs captured by a monocular camera of an ego vehicle, in which each segmentation blob of the one or more segmentation blobs comprises a collection of pixels associated with one respective object of one or more objects in a scene surrounding the ego vehicle;
    performing, by a monocular camera, an autofocus operation to focus the monocular camera on the collection of pixels forming a selected segmentation blob of the one or more segment blobs based on an autofocus function value used by the monocular camera during the autofocus operation;
    determining, according to the autofocus function value received from the monocular camera, a distance to the selected segmentation blob;
    transmitting the determined distance and subsequent determined distances to the selected segmentation blob to a downstream advanced driver assistance system (ADAS);
    identifying, by the ADAS, an object represented by the collection of pixels forming the selected segmentation blob as a moving vehicle according to the determined distance to the selected segmentation blob received from the monocular camera;
    tracking, by the ADAS, a trajectory of the moving vehicle according to the subsequent determined distances to the moving vehicle received from the monocular camera according to subsequent autofocus function values used by the monocular camera to capture the moving vehicle; and
    planning and executing a change in a trajectory of the ego vehicle based on the tracking of the trajectory of the moving vehicle with the ADAS.

2. The method of claim 1, further in which focusing comprises adjusting a focus on the pixels forming the selected segmentation blob until a contrast of the pixels is at a predetermined value.

3. The method of claim 1, further in which focusing comprises adjusting a focus on the pixels forming the selected segmentation blob until a phase detection of the pixels is at a predetermined value.

4. The method of claim 3, in which the phase detection comprises dividing an incoming light into pairs of images and comparing the pairs of images.

5. The method of claim 1, in which segmenting comprises semantic segmentation by detecting each pixel belonging to a class of the selected segmentation blob.

6. The method of claim 1, in which segmenting comprises instance segmentation by identifying each pixel belonging to an instance of the selected segmentation blob.

7. A non-transitory computer-readable medium having program code recorded thereon for range detection, the program code being executed by a processor and comprising:
    program code to segment an image into one or more segmentation blobs captured by a monocular camera of an ego vehicle, in which each segmentation blob of the one or more segmentation blobs comprises a collection of pixels associated with one respective object of one or more objects in a scene surrounding the ego vehicle;
    program code to perform, by a monocular camera, an autofocus operation to focus the monocular camera on pixels forming a selected segmentation blob of the one or more segment blobs based on an autofocus function value used by the monocular camera during the autofocus operation;
    program code to determine, according to the focus function value received from the monocular camera, a distance to the selected segmentation blob;
    program code to transmit the determined distance and subsequent determined distances to the selected segmentation blob to a downstream advanced driver assistance system (ADAS);
    program code to identify, by the ADAS, an object represented by the collection of pixels forming the selected segmentation blob as a moving vehicle according to the determined distance to the selected segmentation blob received from the monocular camera;
    program code to track, by the ADAS, a trajectory of the moving vehicle according to the subsequent determined distances to the moving vehicle received from the monocular camera according to subsequent autofocus function values used by the monocular camera to capture the moving vehicle; and program code to plan and execute a change in a trajectory of the ego vehicle based on the tracking of the trajectory of the moving vehicle with the ADAS.

8. The non-transitory computer-readable medium of claim 7, in which the program code to focus comprises program code to adjust the focus on the pixels forming the selected segmentation blob until a contrast of the pixels is at a predetermined value.

9. The non-transitory computer-readable medium of claim 7, in which the program code to focus comprises program code to adjust the focus on the pixels forming the selected segmentation blob until a phase detection of the pixels is at a predetermined value.

10. The non-transitory computer-readable medium of claim 9, in which the phase detection comprises program code to divide an incoming light into pairs of images and comparing the pairs of images.

11. The non-transitory computer-readable medium of claim 7, in which the program code to segment comprises semantic segmentation by program code to detect each pixel belonging to a class of the selected segmentation blob.

12. The non-transitory computer-readable medium of claim 7, in which the program code to segment comprises instance segmentation by program code to identify each pixel belonging to an instance of the selected segmentation blob.

13. A system on chip for range detection, the system on chip comprising:
- a segmentation blob detection module to segment an image into one or more segmentation blobs captured by a monocular camera of an ego vehicle, in which each segmentation blob of the one or more segmentation blobs comprises a collection of pixels associated with one respective object of one or more objects in a scene surrounding the ego vehicle;
- a segmentation blob focus module to perform, by a monocular camera, an autofocus operation to focus the monocular camera on the collection of pixels forming a selected segmentation blob of the one or more segment blobs based on an autofocus function value used by the monocular camera during the autofocus operation;
- a range detection module to determine, according to the focus function value received from the monocular camera, a distance to the selected segmentation blob and to transmit the determined distance and subsequent determined distances to the selected segmentation blob to a downstream advanced driver assistance system (ADAS);
- the ADAS including a vehicle perception module to identify an object represented by the collection of pixels forming the selected segmentation blob as a moving vehicle according to the determined distance to the selected segmentation blob received from the monocular camera and the ADAS to track a trajectory of the moving vehicle according to received the subsequent determined distances to the moving vehicle received from the monocular camera according to subsequent autofocus function values used by the monocular camera to capture the moving vehicle; and
- a trajectory planning module to plan and execute a change in a trajectory of the ego vehicle based on the determined distance to the moving vehicle and the tracking of the trajectory of the moving vehicle with the ADAS.

14. The system on chip of claim 13, in which the segmentation blob focus module is further configured to adjust the focus on the pixels forming the selected segmentation blob until a contrast of the pixels is at a predetermined value.

15. The system on chip of claim 13, in which the segmentation blob focus module is further configured to adjust the focus on the pixels forming the selected segmentation blob until a phase detection of the pixels is at a predetermined value.

* * * * *